May 30, 1950     C. A. THOMAS     2,509,746
ROTOR WINDING

Filed March 29, 1949

Inventor
Charles A. Thomas
by    *Prarell S. Mack*
His Attorney

Patented May 30, 1950

2,509,746

UNITED STATES PATENT OFFICE 2,509,746

ROTOR WINDING

Charles A. Thomas, Fort Wayne, Ind., assignor to General Electric Company, a corporation of New York Application March 29, 1949, Serial No. 84,087

2 Claims. (Cl. 171—228)

This invention relates to dynamoelectric machines and more particularly to armature windings for small sizes of commutator motors and in particular universal motors, wherein selective commutation is frequently encountered due to the necessity of having few slots in the armature and having two or more coils in each slot.

An object of this invention is to improve the commutation of such machines by providing them with a special form of armature winding, which will produce near linear commutation for each of the coils in the same slot.

Figure 1:
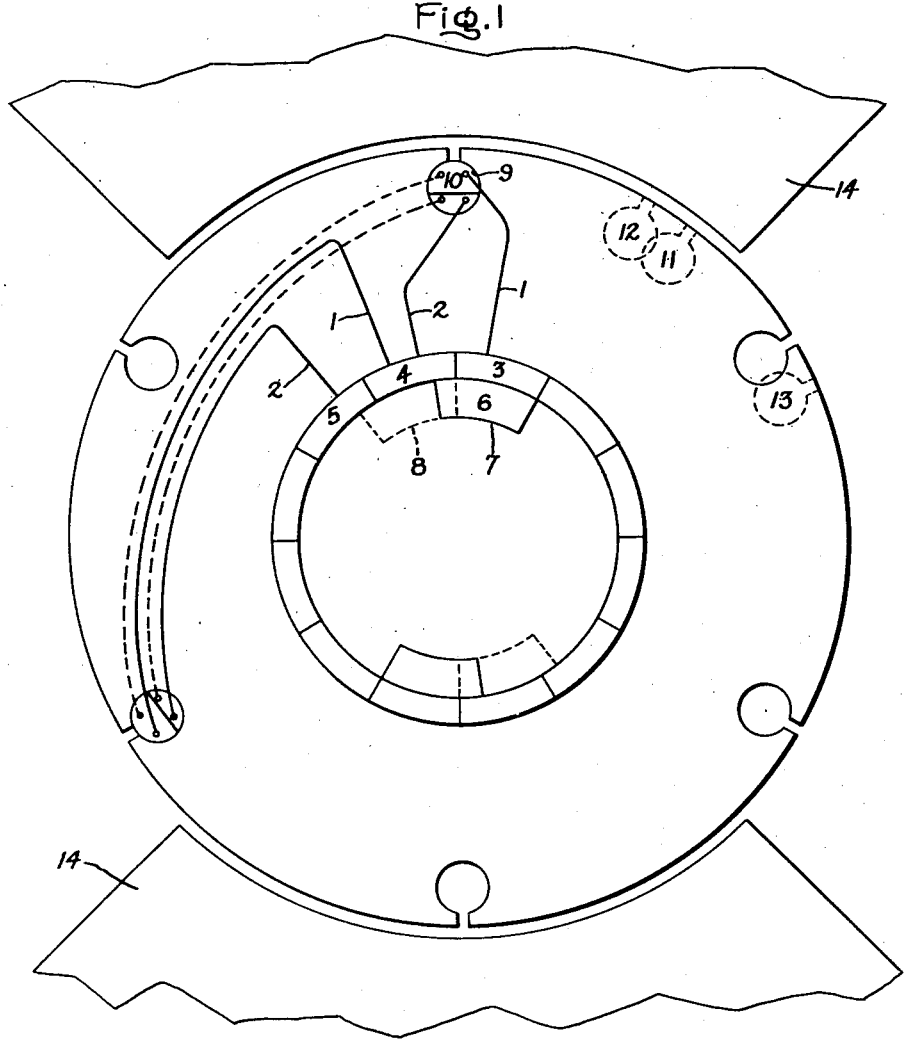
Figure 2:
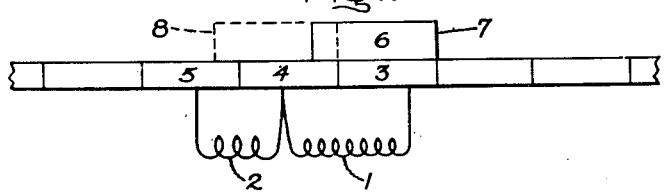

Further objects and advantages of this invention will become apparent and the invention will be better understood from the following description referring to the accompanying drawings, of which Figs. 1 and 2 show the invention in diagrammatic form, and the features of novelty which characterize this invention will be pointed out with particularity in the claims annexed to and forming a part of this specification.

Referring to the drawing, Fig. 1 shows a two pole machine with a rotatable element having six slots with two coils in each slot. There are also shown twelve commutator segments which are connected to the individual coils, two brushes in sliding contact with the commutator segments, and two pole pieces 14 with windings (not shown) that provide excitation for the coils in the rotatable element. It is to be understood that while two or more coils may be located in the same slots in the rotatable element of this type machine, the coils are all in series and each coil performs its individual function in relation to carrying load current.

Fig. 2 shows a development of a portion of the commutator including segments 3, 4, 5 which are connected to coils 1 and 2. In Fig. 2 there is also shown a brush 6 which in the solid line position 7 indicates the short-circuiting of coil 1 by making contact between commutator segments 3 and 4. The dotted position 8 of the brush shows the short-circuiting of coil 2 when the brush is in contact with commutator segments 4 and 5. It is to be understood that actually the brush is stationary and that the commutator moves under the brush.

The problems encountered in this art may be more clearly understood by correlating Figs. 1 and 2 of the drawing. When the brush 6 is in position 7 and short-circuits coil 1 by coming in contact with commutator segments 3 and 4, the slot 9 holding coils 1 and 2 is in position 10 shown in Fig. 1. The commutation period of coil 1 is the length of time it takes slot 9 to move from position 10 to position 11. An instant before slot 9 reaches position 11, the brush starts to short-circuit coil 2 by coming in contact with commutator segments 4 and 5, as indicated by the dotted position 8 of the brush. The total commutation period for coil 2 is the length of time required for slot 9 to move from position 12 to position 13.

It can be readily seen from the drawings that coil 1 is under the influence of the pole flux, during its entire commutating period, while coil 2 has the benefit of this pole flux for only a portion of its commutating period.

Under the conditions above described, it can be appreciated that if coils 1 and 2 were identical, then, for each coil, the self-induced voltage caused by reversal of the armature current in the coil during commutation would be theoretically equal. At the same time, the effect of the generated voltage resulting from the rotation of the short-circuited coil through the field flux would not be equal for coils 1 and 2, but the effect of the generated voltage of coil 1 would be greater than that of coil 2, since coil 1 has a longer duration of rotation through the magnetic flux than coil 2.

The difference between the self-induced voltage and the generated voltage in any short-circuited coil is called the unbalanced voltage of commutation if same periods of time are considered, and it is this unbalanced voltage that controls the amount of arcing at the brushes. By adjusting the strength of the field current, it is possible to regulate the unbalanced voltage and keep it at a level that will prevent arcing at the brushes, but the appropriate value of field current that will keep the unbalanced voltage for the leading coil 1 at the proper level is not the same degree of field current that will maintain the unbalanced voltage of the lagging coil 2 at the proper level, since the unbalanced voltage of the lagging coil 2 is greater than that of the leading coil 1 due to the fact that the effect of the generated voltage of the lagging coil 2 is not as great as that of the leading coil 1.

Where machines are large enough or where weight and performance limits are not too closely regulated, standard methods of balancing the generated and self-induced voltages can be employed, such as the use of interpoles. However, in small motors, such as universal motors in the portable tool class, the commercial requirements necessitate a small inexpensive design and yet require a brush and commutator life of several years under normal use. Due to brush coverage and the limited number of slots available because of the size and performance in the subject class of motors, the fields cannot be set so that all coils per slot have proper field density for satisfactory commutation and still secure the desired motor output. In order to overcome this condition in my improved motor construction there is used an unequal number of turns for each coil per slot. The coils having the most advantageous commutating position are given more turns than those less favorably situated. It has been found in motors so constructed that the brush and commutator life is noticeably improved.

This invention presents a solution to the specific problems of selective commutation since it shows how to adjust the unbalanced voltage for each of the coils in the same slot to the point where they are equal and within the range that produce good commutation which in turn results in improved brush and commutator life.

Fig. 2 shows schematically two coils 1 and 2 connected to commutator segments, 3, 4, 5. In the ordinary machine, the number of turns in each of these coils would be equal, but according to this invention in each slot a number of turns is subtracted from the lagging coil 2 and respectively added to the leading coil 1 so that coil 2 has a fewer number of turns than coil 1, while the total number of turns in any one slot, or in the whole winding has not been changed.

In accordance with this invention, when coil 2 is commutating, the unbalanced voltage of commutation becomes less than when the coils are of equal turns since the number of turns is reduced, while the unbalanced voltage in the leading coil 1 is somewhat increased due to the increased number of turns therein. When the number of turns are properly adjusted in these two coils the two unbalanced voltages are nearly equal in effect and of such a value that they do not produce arcing at the commutator, hence the life of the brush and commutator is increased.

The desired number of turns per coil can be computed or secured by experimentation, but since it depends so much on the individual design no definite ratio of the number of turns in each coil can be given to cover all cases.

In operation, to take a specific example, when there are two coils in each slot with each coil having the same pitch around the rotatable member, the alternate coils have the same number of turns per coil while successive coils have a different number of turns per coil and the sum of the coil turns in any two successive coils is constant.

In agreement with the preceding discussion, if more than two coils are used in each slot with each coil having the same pitch, then each group of coils in the same slot can be called a set and the corresponding coils in all sets will have the same number of turns while any one coil in a set will have a number of turns different from the other coils in that set, and the sum of the coil-turns in any one set is constant.

Modifications of this invention will occur to those skilled in the art and it is desired to be understood, therefore, that this invention is not to be limited to the particular arrangement disclosed but that the appended claims are meant to cover all modifications which do not depart from the spirit and scope of this invention.

What I claim as new and desire to secure by Letters Patent of the United States is:

1. In a dynamoelectric machine, a rotatable member having a slotted core and a commutator, a winding for said rotatable member including a plurality of coils connected in series and numerically divided into equal sets spaced around said member at normal coil pitch, corresponding coils of all sets having the same number of winding-turns, and each coil in a set having a number of winding-turns different from the other coils in that set.

2. In a dynamoelectric machine, a rotatable member having a slotted core and a commutator, a winding for said rotatable member comprising a plurality of coils connected in series, alternate coils having the same number of turns per coil and successive coils having a different number of turns per coil, two successive of said coils forming a pair and being located in the same slot in said member, the remaining pairs of successive coils being spaced around said member at normal coil pitch.

CHARLES A. THOMAS.

No references cited.